(12) United States Patent
Anderson et al.

(10) Patent No.: US 7,101,500 B2
(45) Date of Patent: Sep. 5, 2006

(54) METHOD FOR CREATING A SUBSTANTIALLY UNIFORM TEMPERATURE ACROSS A PLASTIC SHEET FOR DELIVERY TO AN APPLIANCE LINER THERMOFORMING DEVICE

(75) Inventors: Ronald K. Anderson, Galesburg, IL (US); Xiaoyong Fu, Galesburg, IL (US); Sheldon Wayne Mandel, East Galesburg, IL (US); Steven G. Tirrell, Jackson, TN (US)

(73) Assignee: Maytag Corporation, Newton, IA (US)

( * ) Notice: Subject to any disclaimer, the term of this patent is extended or adjusted under 35 U.S.C. 154(b) by 826 days.

(21) Appl. No.: 09/867,434

(22) Filed: May 31, 2001

(65) Prior Publication Data

US 2001/0028124 A1    Oct. 11, 2001

Related U.S. Application Data

(62) Division of application No. 09/305,305, filed on May 5, 1999.

(51) Int. Cl.
*B29C 51/02*    (2006.01)

(52) U.S. Cl. ............... 264/37.17; 264/40.1; 264/322; 264/544

(58) Field of Classification Search ............ 264/37.17, 264/40.1, 143, 322, 325, 544
See application file for complete search history.

(56) References Cited

U.S. PATENT DOCUMENTS

| | | | |
|---|---|---|---|
| 3,115,677 A | 12/1963 | Thiel | |
| 3,157,719 A | 11/1964 | Ferrari | |
| 3,471,601 A | 10/1969 | Goetgheluck | |
| 3,502,310 A | 3/1970 | Coffman | |
| 3,684,258 A | 8/1972 | Coffman et al. | |
| 3,713,765 A | 1/1973 | Rise | |
| 3,728,799 A * | 4/1973 | Streltsov ................ | 34/619 |
| 3,744,262 A | 7/1973 | Bose | |
| 3,837,517 A | 9/1974 | Held, Jr. | |
| 4,039,609 A | 8/1977 | Thiel et al. | |
| 4,105,386 A | 8/1978 | Thiel et al. | |
| 4,147,487 A | 4/1979 | Dickerson et al. | |
| 4,234,536 A | 11/1980 | Thiel et al. | |
| 4,306,856 A | 12/1981 | Arippol | |
| 4,431,404 A | 2/1984 | Cobb et al. | |
| 4,619,806 A | 10/1986 | Gunn | |
| 4,666,394 A | 5/1987 | Wakamiya et al. | |
| 4,842,742 A | 6/1989 | Plante | |
| 5,423,669 A | 6/1995 | Chapman | |
| 5,468,139 A | 11/1995 | Stender | |
| 5,507,999 A | 4/1996 | Copsey et al. | |
| 5,620,715 A | 4/1997 | Hart et al. | |
| 5,759,591 A | 6/1998 | Rhoades et al. | |

FOREIGN PATENT DOCUMENTS

GB        1521037      *  8/1978

* cited by examiner

*Primary Examiner*—Edmund H. Lee
(74) *Attorney, Agent, or Firm*—Diederiks & Whitelaw, PLC

(57) ABSTRACT

A sheet of plastic to be thermoformed into an appliance liner is brought to a substantially uniform temperature, preferably to a temperature differential of less than 5° F. throughout, by directing a fluid medium upon opposing side surfaces of the sheet. In the most preferred form of the invention, the fluid medium is constituted by air which is heated, impinged upon the opposing surfaces and recirculated, with the temperature and flow rate of the air being controlled based on sensed operating parameters.

11 Claims, 5 Drawing Sheets

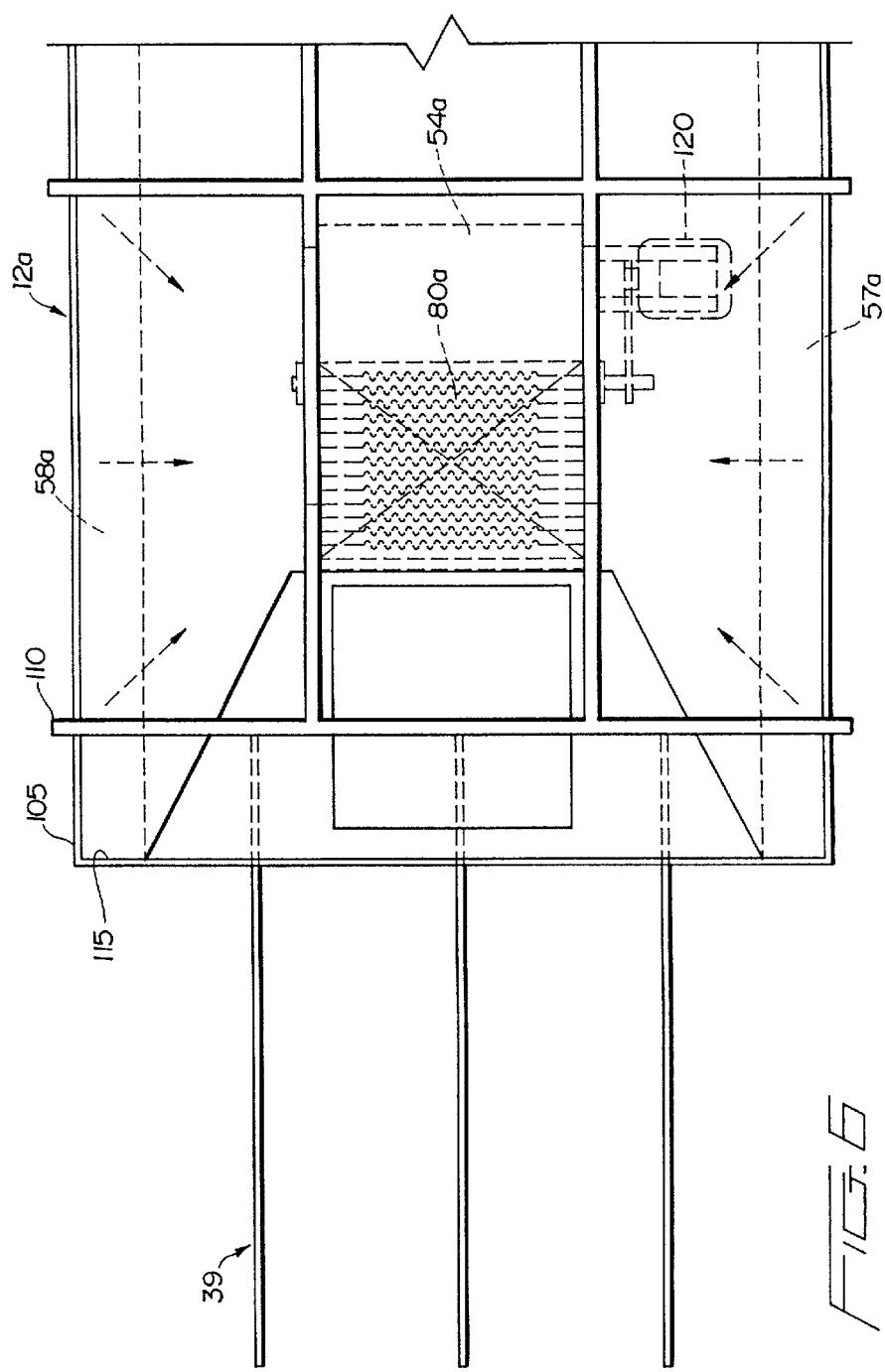

METHOD FOR CREATING A SUBSTANTIALLY UNIFORM TEMPERATURE ACROSS A PLASTIC SHEET FOR DELIVERY TO AN APPLIANCE LINER THERMOFORMING DEVICE

This application represents a divisional of U.S. patent application Ser. No. 09/305,305 filed May 5, 1999, pending.

BACKGROUND OF THE INVENTION

1. Field of the Invention

The present invention pertains to the art of thermoforming appliance liners and, more particularly, to a method and apparatus for developing a substantially uniform temperature across a plastic sheet for delivery to an appliance liner thermoforming device.

2. Discussion of the Prior Art

In forming liners for appliances, such as refrigerators and dishwashers, it is known to extrude sheets or billets of thermoplastic material to be delivered to a thermoforming device. Following the extrusion process, the sheets will be at a temperature in the order of 130° F. and are typically stacked for later delivery to the thermoforming device. At times, the sheets can remain in a given stack for a week or more prior to actually being formed into a liner.

The temperature environment in which the sheets are stacked is typically not uniformly regulated. For instance, the sheets can be placed in a 60° F. or less environment in the winter season and subjected to over 100° F. temperatures in the summer. In addition, since the sheets can remain in the stacks for some time, the outer stacked sheets will generally reach the ambient temperature, while the inner sheets will stay fairly hot. Furthermore, the outer edge portions of each inner sheet will assume a lower temperature than the center of the sheet.

Based on at least these reasons, the actual temperatures of the various sheets delivered to the thermoforming device can vary greatly which, in turn, can result in the production of thermoformed articles having varying wall thicknesses and varying amounts of "formed in" stresses. This problem is particularly significant in the field of the present invention wherein an extruded sheet of approximately 5 mm (0.20 inches) thick is stretched to form a liner in the order of two feet deep, with the liner walls being extremely thin, generally in the order of less than 0.7 mm (0.03 inches). With varying temperatures across the sheet, the sheet will unevenly stretch, perhaps resulting in a liner having certain wall portions which are disadvantageously thin and prone to cracking.

In an attempt to compensate for potential product variations, it has been proposed in the art to pre-heat plastic sheets to be thermoformed. For instance, U.S. Pat. No. 4,842,742 is directed to controlling the heating of different portions of a synthetic resin sheet delivered to a vacuum forming device to create a refrigerator liner. The actual purpose of the controlled heating is to provide a desired differential thickness in different portions of the liner. More specifically, an oven is provided to heat a sheet received from a stacked pallet prior to delivery of the sheet to a vacuum forming device. The heating oven includes upper and lower platens for the differential heating of the sheet. Other arrangements have also been proposed to maintain accurate temperature control in the heating of at least one side of a plastic sheet.

Regardless of the prior attempts made in pre-heating plastic sheets, there still exists a need for a method and apparatus for forming a liner of an appliance from an extruded sheet which is delivered at a substantially uniform temperature to a thermoforming device. More specifically, there exists a need for a compact and efficient device and method for providing a consistent and substantially uniform temperature sheet which is to be thermoformed into an appliance liner.

SUMMARY OF THE INVENTION

The present invention is directed to a method and apparatus for developing a substantially uniform temperature across a sheet of plastic, i.e., to a temperature differential of less than 5° F. throughout, prior to delivery of the sheet to an appliance liner thermoforming device. More specifically, a fluid medium flow is directed unto opposing side surface portions of a sheet being delivered to a thermoforming device from a stack of extruded sheets.

In the preferred embodiment of the invention, the fluid medium is constituted by air and at least one blower is used in combination with at least one temperature control unit to develop the flow of air used in creating the uniform temperature of the sheet. The air is directed through nozzles to impinge upon the opposing side surface portions of the sheet. In the most preferred form of the invention, the air flow is heated and recirculated, with the temperature and flow rate of the air being controlled based on sensed operating parameters.

BRIEF DESCRIPTION OF THE DRAWINGS

FIG. 6 is a top view of one module of the pre-heating unit of FIG. 4, with various internal structural components being shown in phantom.

DETAILED DESCRIPTION OF THE PREFERRED EMBODIMENT

Figure 1:
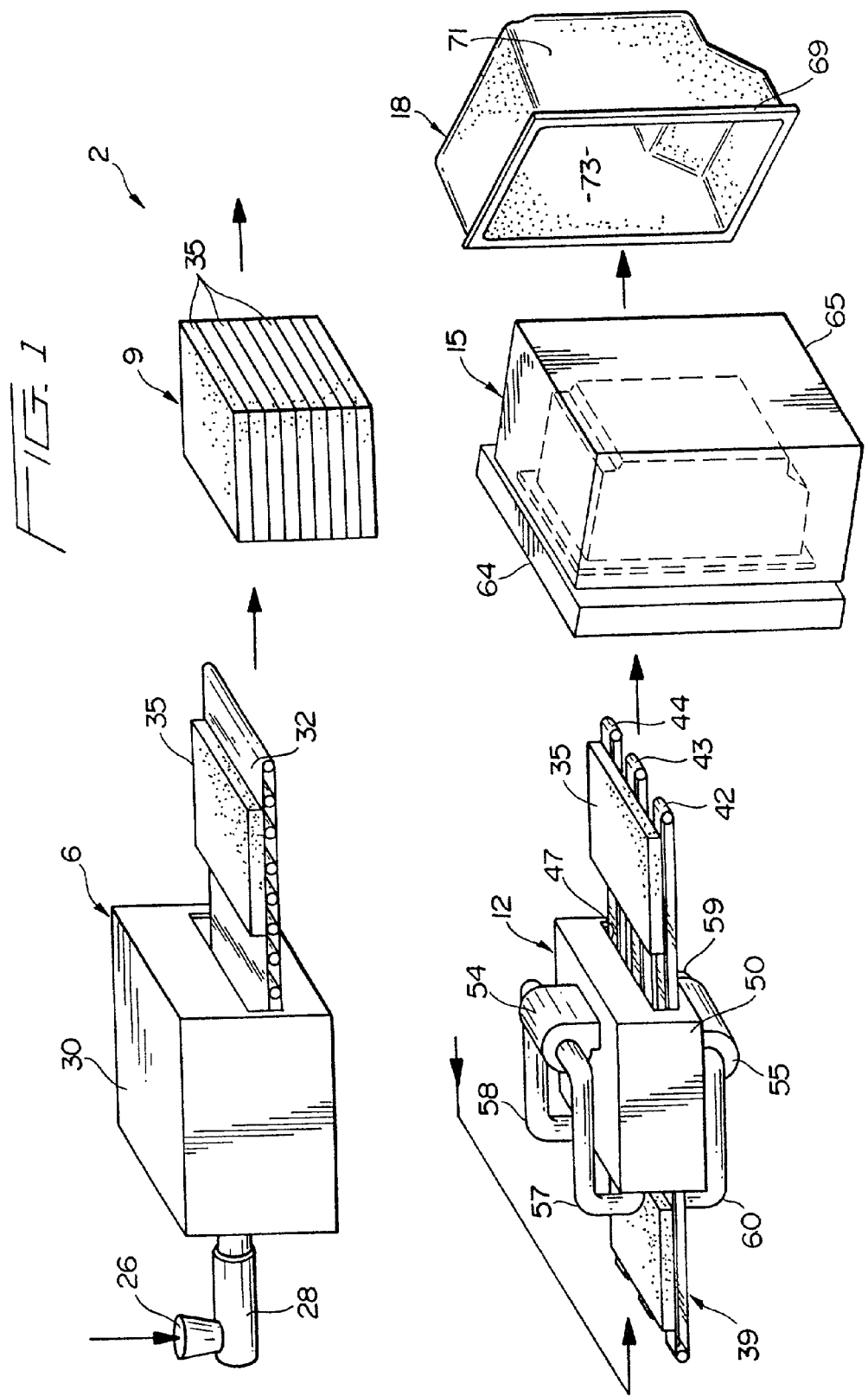
FIG. 1 is a schematic representation of a system for producing an appliance liner in accordance with a preferred embodiment of the present invention.

With initial reference to FIG. 1, an appliance liner formation system, generally indicated at 2, includes a sheet forming unit 6 which functions to produce sheets to be placed in a stack 9 and a temperature control unit 12 to which the sheets are delivered from stack 9 prior to delivery to a thermoforming device 15. In the most preferred form of the invention, temperature control unit 12 constitutes a pre-heating unit used to uniformly heat the sheets prior to delivery to thermoforming device 15. Therefore, for purposes of discussing the preferred embodiment, reference will be made to pre-heating unit 12. In a manner known in the art, thermoforming device 15 is used to create an appliance liner, such as refrigerator liner 18. The present invention is particularly directed to the construction and operation of pre-heating unit 12 in the overall appliance liner formation system 2. In any event, for the sake of completeness, further details of appliance liner formation system 2 will be provided below.

Sheet forming unit 6 is provided with a plastic material inlet 26 which directs plastic material into an extruder 28. Extruder 28 leads into a housing 30 within which the extruded plastic material is forced through one or more dies to form sheets which are cut and delivered out of housing 30 by means of a conveyer 32 in the form of sheets, one of which is indicated at 35. In practice, the various sheets 35 are stacked for later use, typically in an area which does not have a specifically regulated temperature environment. As discussed above, the sheets in stack 9 can be subjected to temperatures ranging from approximately 60° F. or less to temperatures of over 100° F. depending upon the season of the year and other temperature affecting factors. In any event, it should be readily apparent that liners formed from sheets which vary greatly in temperature when delivered to thermoforming device 15 will also vary in wall thickness and overall durability.

With this in mind, pre-heating unit 12 is adapted to receive each sheet 35 and to preheat the same to a substantially uniform temperature prior to delivery to thermoforming device 15. In the most preferred embodiment of the invention, the sheet 35 is heated to establish a temperature differential of less than 5° F. throughout the entire sheet 35. Therefore, a respective sheet 35 will be taken from stack 9 and placed upon a conveyer 39 for use in transporting the sheet 35 through preheating unit 12. In the preferred embodiment, conveyer 39 includes first, second and third transversely spaced and longitudinally extending endless support belts 42–44 for supporting and delivering each of the sheets 35 through a passage 47 defined by an enclosure portion 50 of pre-heating unit 12. In this preferred embodiment, the multiple endless support belts 42–44 are constituted by approximately 2.54 cm (1 inch) wide rubber belts which are designed to minimize the contact area with the sheet 35 so as to expose the entire upper surface and the majority of the lower surface of the sheet 35.

In accordance with the present invention, pre-heating unit 12 achieves an accurate and consistent uniform heating of successive sheets 35 by impinging a flow of heated air upon upper and lower surfaces of the sheet 35 within enclosure 50. For this purpose, enclosure 50 has attached thereto an upper blower 54 and a lower blower 55 which receive an intake of air from respective return lines 57–60. Additional details of the structure and function of blowers 54 and 55 will be provided below.

Upon exiting from pre-heating unit 12, the sheet 35 will be directly delivered to thermoforming device 15. In a manner known in the art, thermoforming device 15 includes a male mold member 64 and a female mold member 65 between which the sheet 35 is positioned. In the preferred embodiment, a vacuum-based thermoforming process is performed. Although the present invention can be utilized to form various types of appliance liners, including liners for dishwashers, in the most preferred embodiment, each sheet 35 is utilized to form a respective refrigerator liner 18 generally provided with a peripheral front flange 69 and a body portion 71 that defines an interior storage area 73. Although liner 18 can be formed from various polymers, a preferred material is a high impact polystyrene (HIPS). Of course, in forming liner 18, the material of sheet 35 must be stretched in order to create the interior storage area 73. Therefore, a sheet 35 having an initial thickness in the range of approximately 5 mm (0.20 inches) is vacuumed formed into liner 18 having a preferred wall thickness of approximately 0.7 mm (0.03 inches) and a depth of approximately 60 cm (2 feet). Of course, the actual thickness and depth of the liner 18 can vary without departing from the present invention and the thickness of sheet 35 will correspondingly change.

Figure 2:
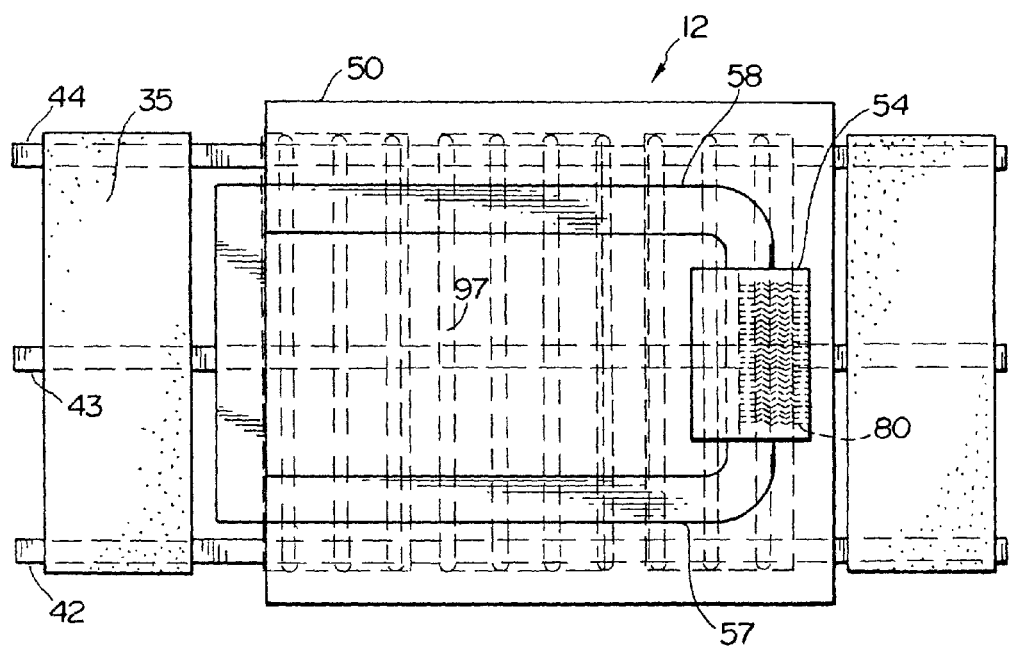
FIG. 2 is a top view of a sheet pre-heating unit incorporated in the system of FIG. 1.
Figure 3:
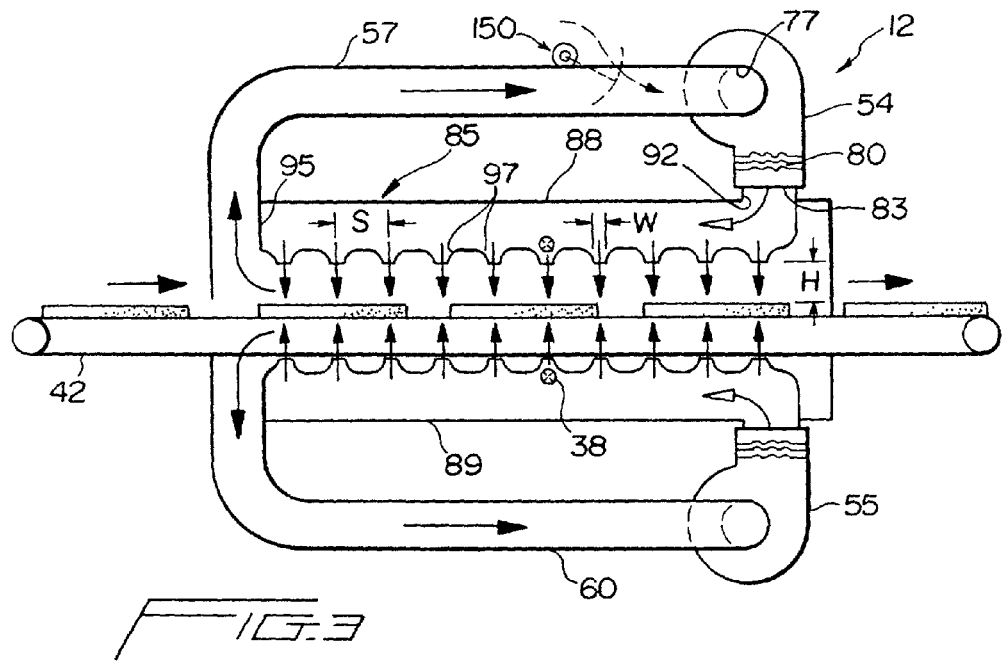
FIG. 3 is a schematic side view of the sheet pre-heating unit shown in FIG. 2.

Reference will now be made to FIGS. 2 and 3 in describing a preferred embodiment for pre-heating unit 12. In the preferred form shown, upper and lower blowers 54 and 55 are identically constructed. Although two separate blowers are shown for directing a flow of air upon the upper and lower surfaces of each sheet 35, it should be recognized that a larger, single blower unit could be provided. In any event, in the embodiment shown, each blower 54, 55 includes an intake 77 for drawing in a flow of air to be heated through respective return lines 57–60. Blowers 54 and 55 can take various forms in accordance with the present invention, such as variable speed, centrifugal squirrel cage type fans, and are readily available in the marketplace. Each blower 54, 55 incorporates a heating unit 80 which, in the preferred embodiment, constitutes an electric, resistance heating element. In this matter, each blower 54, 55 draws in the air to be heated and directs the air to a respective outlet 83.

The outlets 83 of upper and lower blowers 54 and 55 lead to a manifold assembly 85. In the preferred embodiment, manifold assembly 85 includes an upper manifold section 88 and a lower manifold section 89. Since upper and lower manifold sections 88 and 89 are substantially identically constructed, the preferred construction for upper manifold section 88 will now be described in detail and it is to be understood that a corresponding structure for lower manifold section 89 is provided.

Upper manifold section 88 includes an inlet 92 which directly receives a flow of air from the outlet 83 of upper blower 54. As shown, upper manifold section 88 includes a closed rear wall 95 and is provided with a plurality of transversely elongated and longitudinally spaced outlet nozzles 97. As clearly indicated in FIG. 2, each nozzle 97 preferably extends transversely within enclosure 50 a distance substantially equal to the transverse dimension of the sheet 35. Due to the presence of closed rear wall 95, all of the air expelled from blower 54 and heated by unit 80 is forced into upper manifold section 88 and must flow through the respective nozzles 97 onto the upper surface of one or more sheets 35 concurrently being transported through pre-heating unit 12. In this manner, upper manifold section 88 represents a common enclosed zone into which the heated air from blower 54 is expelled for distribution to nozzles 97. Therefore the actual construction of upper manifold section 88, and manifold assembly 85 as a whole, can take various forms in accordance with the present invention, including simple ductwork or piping, without departing from the invention. In any event, due to the similar construction for lower manifold section 89, the lower surface of each sheet 35 also has impinged thereon a flow of heated air. Therefore, due to the arrangement of manifold sections 88 and 89 and nozzles 97, a uniformly distributed flow of heated air impinges upon the upper and lower surfaces of the sheets 35 which, in turn, enables each of the sheets 35 to be heated to the uniform temperature in accordance with the present invention.

In the preferred embodiment, the sheets 35 are heated to a temperature in the order of 130–140° F. for the production of liner 18, with this temperature being above any expected ambient temperature for stack 9 to assure a heating of sheets 35 in pre-heating unit 12, with a temperature of approximately 140° F. being preferred. Of course, various factors directly reflect upon the ability of pre-heating unit 12 to uniformly and consistently heat each sheet 35 as it passes through enclosure 50. For instance, the air flow rate, the slot width (W) for each of the nozzles 97, the spacing (S) between adjacent nozzles 97 and the distance (H) from the outlet of each nozzle 97 to the respective surface of the impinged sheet 35 are major input parameters which have been optimally designed in accordance with the present invention. Extensive experimental and theoretical research has been devoted over the years to impinging flow and heat/mass transfer resulting in optimal values of W and S which are as follows:

$W \approx 0.1H \ \& \ S=1.4H$

Reduced scale testing in accordance with the present invention was initially done on a sheet having the length of 42 mm (16.5 inches), a width of 20 mm (8 inches) and a thickness of 6 mm (0.24 inches). The arrangement of nozzles 97 were established based on the above formulas utilizing a distance of 76 mm (3 inches) from the exit of the nozzles 97 to the respective centerline of the sheet which resulted in a nozzle spacing of approximately 107 mm (4.2 inches) and a nozzle width of 7.6 mm (0.3 inches).

It is generally desirable in accordance with the present invention to make pre-heating unit 12 rather compact. In accordance with the preferred form of the invention, it is desired to have pre-heating unit 12 sized to simultaneously heat in a range of three to five (3–5) sheets in any given time. In addition, it is desirable to establish a reasonable heating time which, in the preferred embodiment, is approximately 40 seconds. With these established parameters and desired operation characteristics in mind for the reduced scale testing, a flow of heated air at approximately 140° F. was impinged upon the upper and lower surfaces of the sheet of approximately one square foot at a mass flow rate of 610 CFM (cubic feet per minute). Furthermore, through this testing, it was determined that a static pressure range of approximately 0.7–0.9 in. $H_2O$ within enclosure 50 is practical and economical for the heating of the sheets.

Figure 5:
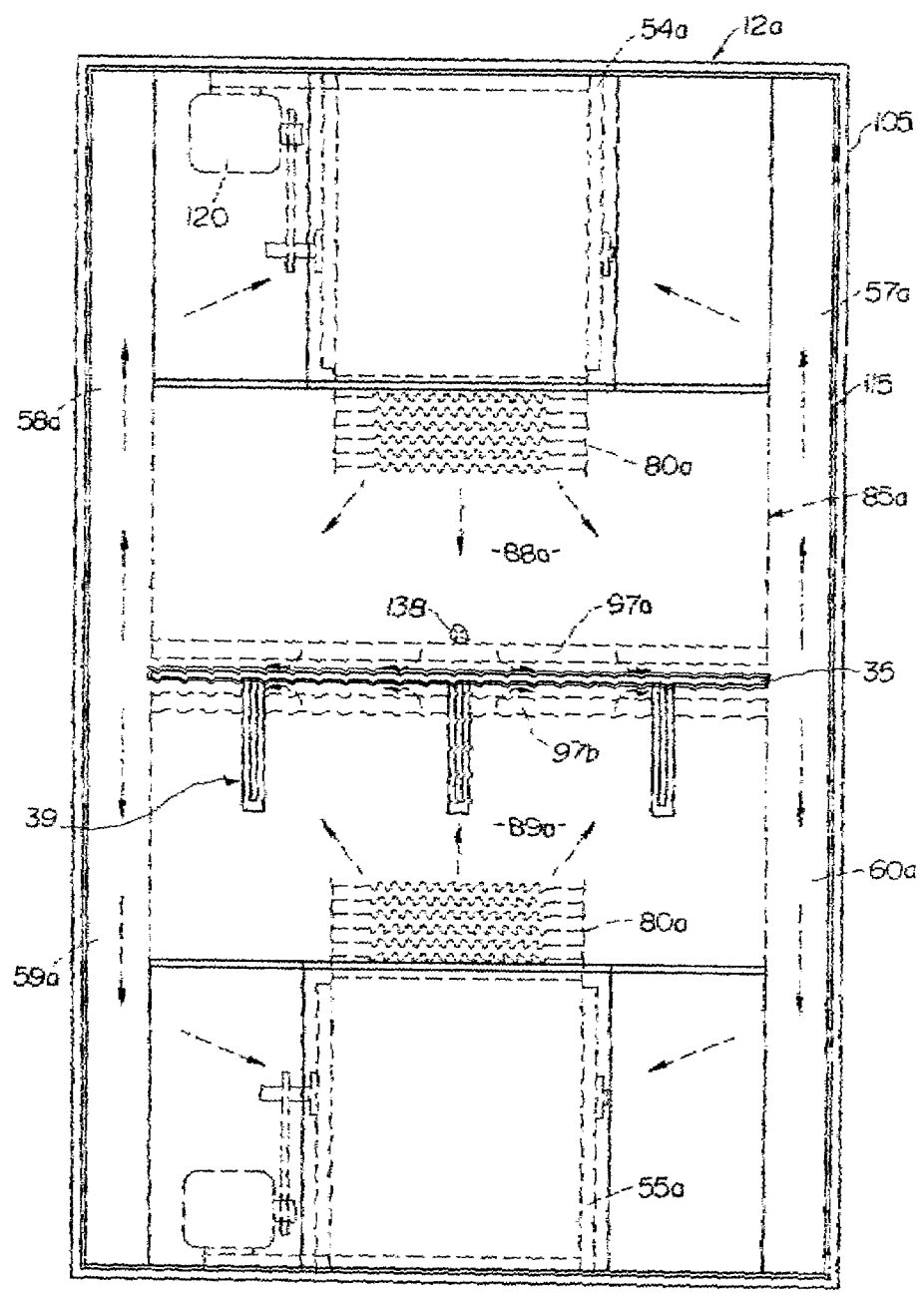
FIG. 5 is a side view of the pre-heating unit of FIG. 4, with various internal structural components being shown in phantom.
Figure 4:
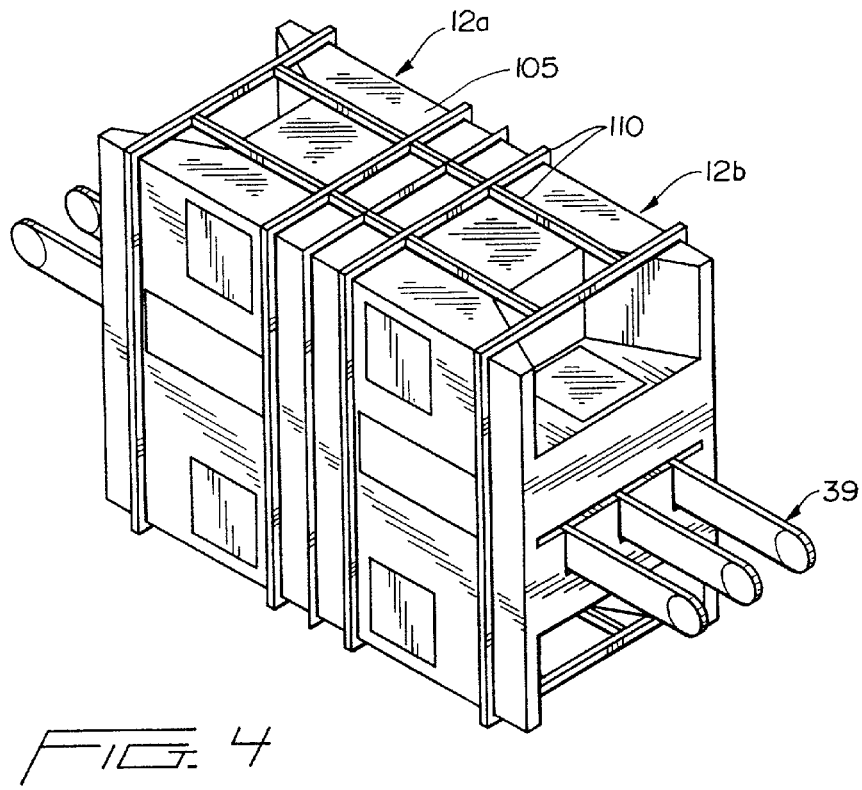
FIG. 4 is a perspective view of a sheet pre-heating unit constructed in accordance with a second embodiment of the invention.

At this point, it should be realized that the pre-heating unit can take various forms in accordance with the present invention. In forming refrigerator liner 18, each sheet 35 is preferably constituted by a 122 cm×244 cm (4'×8') high impact polystyrene sheet. To assure uniform heating of each sheet 35, the pre-heating unit would actually be built on a much larger scale such as represented by the embodiment of FIGS. 4–6. More specifically, this preferred embodiment incorporates two modular pre-heating units 12a and 12b which are arranged back-to-back and secured together for use with an elongated conveyer 39. Therefore, modular preheating units 12a and 12b are integrated to form a single unit, with each pre-heating unit 12a, 12b having associated therewith an outer enclosure 105 which is preferably made from galvanized sheet metal and structurally reinforced by a framework 110. In the preferred embodiment, framework 110 is defined by welded square steel tubing. Within enclosure 105 is provided a layer of insulation 115, such as approximately 2 cm (0.75 inch) expanded polystyrene (EPS).

As shown, each pre-heating unit module 12a, 12b includes an upper blower 54a having an associated electric heating element 80a for directing a flow of heated air into a manifold assembly 85a that leads to a nozzle array 97a. A similar lower blower 55a is also provided with a corresponding electric heating element 80a opening into manifold assembly 85a for distributing heated air to nozzle array 97b. In this preferred embodiment, each blower 54a, 55a is capable of producing an output of 15,000 CFM and is driven by a respective electric motor 120 having a preferable power rating of 5 hp. Each heater unit 80a is constituted by a 15 kW unit which has an associated low pressure drop. This overall arrangement functions to provide a preferred static pressure head of 0.85 in. $H_2O$. Although not clearly shown in the drawings, each of the corners for enclosure 105 is preferably reinforced with steel angle iron or the like.

Figure 7:
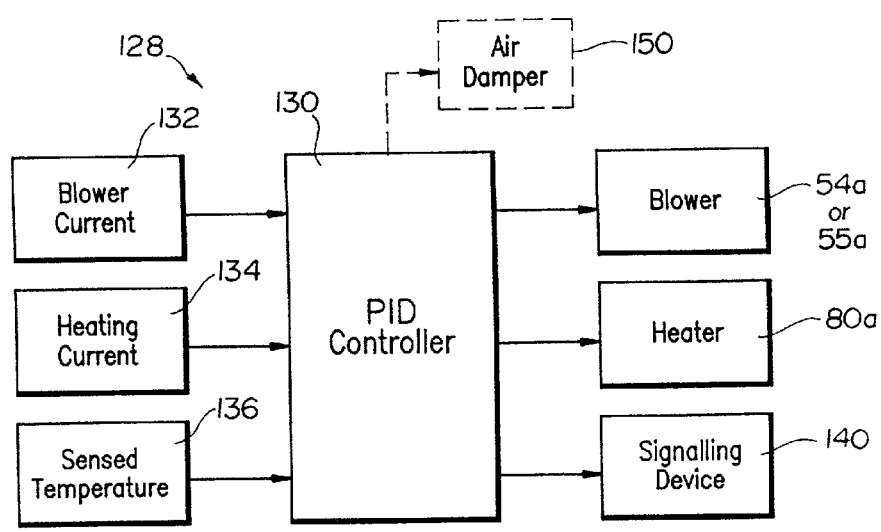
FIG. 7 is a block diagram of a control system for the pre-heating unit of the invention.

As clearly shown in FIG. 5, enclosure 105 can simply be subdivided by suitable, preferably sheet metal walls to define upper and lower, distinct manifold sections 88a and 89a of overall manifold assembly 85a, as well as to define ducting channels 57a, 58a, and 59a, 60a which function to recirculate air in a manner directly corresponding to return lines 57–60 in the embodiment shown and described above with reference to FIGS. 1–3. In the full scale production model, the distances for nozzle spacing, width and height relative to each sheet 35 are carried over from the established reduced scale testing. However, in this embodiment, it is actually preferred to accommodate a total of four (4) sheets 35 simultaneously within the pre-heating units 12a and 12b. Also preferably incorporated as part of the invention is a system controller generally indicated at 128 in FIG. 7. In the most preferred form of the invention, a separate system controller is provided for each of the upper and lower blower/heater arrangements. In addition, each system controller 128 preferably includes a PID controller 130 which receives input signals related to the current drawn by a respective blower as indicated at 132, the current drawn by a respective heater as indicated at 134 and, at 136, a temperature signal representative of the sensed temperature adjacent at least one of the nozzles 97 as indicated by the presence of a thermistor 138 (see FIG. 3 or 5).

In essence, since the individual temperatures of sheets 35 can fluctuate substantially given the particular season of the year and also the environment in which they are stored within stack 9, the rate at which each blower 54a, 55a is driven and the amount of current supplied to each heating unit 80a can be controlled to assure the desired output temperature of the air impinged upon each sheet 35. In order to reduce the influence of blower assembly heat, the target sheet temperature has been selected substantially above normal ambient temperatures. Under conditions of high ambient temperature and high sheet temperature, it may become necessary to mitigate the effects of heating due to the inherent inefficiencies of the blower units. While it is recognized that a cooling coil may be placed in the airstream, such as in the return lines or directly in the blowers adjacent to the heater elements, it is desirable to avoid both the initial and operating expenses of such a chiller arrangement. In the most preferred form of the invention, the heat introduced by the blower units is addressed by lowering the rate at which each blower is driven. An alternative method to mitigate the heating effects of the blower assemblies is to place a motor actuated damper on one or more of the return lines. For instance, note FIG. 3 and the presence of damper 150 which is situated so that, when fully opened, damper 150 allows free entry of ambient air into the return lines 57–60. Correspondingly, the PID controller would have an additional output to control damper(s) 150 as indicated in phantom in FIG. 7.

In any event, as indicated above, it is desirable to provide heated air at a rate and temperature which will uniformly heat the sheet 35, i.e., to within a 5° F. differential throughout the entire sheet 35. Knowing the desired resulting sheet temperature, the varying operating conditions can be accounted for through each controller 130 based on the blower current inputted at 132, the current inputted at 134 and the sensed temperature provided at 136, assuming a constant speed for conveyor 39. However, conveyor speed could also constitute an input to be further regulated by controller 130 if desired. Therefore, each controller 130 will output a desired current to both a respective blower 54a, 54b and heater 80a to maintain the desired airflow rate and temperature. Any problems in maintaining this operation will result in the activation of indicator lights and/or alarms at signalling device 140.

Although described with respect to a preferred embodiment of the invention, it should be readily understood that various changes and/or modifications can be made to the invention without departing from the spirit thereof. In particular, it should be readily recognized that the invention deals with creating a substantially uniform temperature of each sheet 35 for delivery to the thermoforming device 15. Therefore, although the most preferred form of the invention utilizes a pre-heating unit to achieve this result, the sheets 35 could also be cooled to a uniform temperature for delivery to the thermoforming device 15 in accordance with the invention. In addition, the temperature and flow rate of the air, the configuration of nozzles 97, the material and size for sheets 35 and the temperature control duration associated with the present invention can be altered depending on various factors, including the particular product to be formed, a desired production rate, etc., without departing from the spirit of the invention. Furthermore, although upper and lower manifold sections with separate blowers are provided in the preferred embodiments described, it should be recognized that a single, annular manifold assembly with one or more blowers could be utilized without departing from the spirit of the invention. Therefore, the particular construction and operation of the temperature control unit can be varied while still achieving uniform temperature throughout a sheet preferably by an impinging air flow regardless of the initial temperature of the various sheets entering the temperature control unit in accordance with the present invention. In any event, the invention is only intended to be limited by the scope of the following claims.

We claim:

1. A method of forming an appliance liner comprising:
   extruding a sheet from a plastic material;
   arranging the sheet in a stack of similarly extruded sheets wherein the sheet is permitted to cool;
   transferring the sheet to a temperature control unit;
   directing a temperature controlled fluid medium onto opposing side surfaces of the sheet within the temperature control unit to establish a substantially uniform temperature across the sheet, wherein the directed temperature controlled fluid medium directly contacts the opposing side surfaces; and
   delivering the sheet to a thermoforming device for creating the appliance liner.

2. The method according to claim 1, further comprising: creating the substantially uniform temperature by impinging the fluid medium to a temperature differential across the entire sheet of less than 5° F.

3. The method according to claim 1, further comprising:
   delivering the fluid medium through a manifold assembly unto the opposing side surfaces of the sheet; and
   recirculating the fluid medium through the manifold assembly.

4. The method according to claim 1, further comprising: developing a flow of air as the fluid medium through the use of first and second blowers, with each of the first and second blowers developing an air flow rate of approximately 15,000 CFM.

5. The method according to claim 1, further comprising: operating the temperature control unit at a static pressure in the range of 0.7–0.9 in. $H_2O$.

6. The method according to claim 1, further comprising:
   extruding the sheet at a thickness of approximately 5 mm (0.20 inches); and
   creating an appliance liner with a depth of approximately 61 cm (2 feet).

7. The method according to claim 1, further comprising: directing the air onto the opposing side surfaces of the sheet from nozzles spaced approximately 76 mm (3 inches) from the opposing side surfaces.

8. The method according to claim 1, further comprising:
   sensing operating parameters of the temperature control unit; and
   regulating the temperature control unit based on the sensed operating parameters.

9. The method according to claim 8, further comprising: heating the sheet to a temperature of approximately 130°–140° F.

10. The method according to claim 1, further comprising:
    utilizing air, supplied by a blower unit, as the fluid medium; and
    controlling an amount of heat added to the air by the blower unit by varying an operating speed of the blower unit.

11. The method according to claim 1, further comprising:
    developing a flow of air as the fluid medium through the use of at least one blower which directs the flow of air into a manifold assembly; and
    regulating the position of a damper unit to control an introduced amount of ambient air into the manifold assembly.

* * * * *